United States Patent [19]

Shino et al.

[11] Patent Number: 4,874,592
[45] Date of Patent: Oct. 17, 1989

[54] PRODUCTION PROCESS OF XENON

[75] Inventors: Masami Shino; Hideaki Takano; Jitsuo Nakata; Katsuhiko Noro, all of Wakayama, Japan

[73] Assignee: Kyodo Oxygen Co., Ltd., Japan

[21] Appl. No.: 235,328

[22] Filed: Aug. 23, 1988

[51] Int. Cl.$^4$ ............ B01D 53/04; B01D 53/36; C01B 23/00

[52] U.S. Cl. .................. 423/262; 55/28; 55/66; 55/68; 423/245.3

[58] Field of Search .......... 423/219, 245.3, 262; 55/68, 66, 27, 28

[56] References Cited

U.S. PATENT DOCUMENTS

| 1,670,014 | 5/1928 | Blaringhem | 423/262 |
| 2,793,507 | 5/1957 | Hnilicka | 55/66 |
| 2,962,868 | 12/1960 | Dennis | 423/262 |
| 3,971,640 | 7/1976 | Golovko | 55/66 |
| 4,732,584 | 3/1988 | Coe et al. | 55/68 |

FOREIGN PATENT DOCUMENTS 659822  3/1963  Canada ............... 55/66
812397  4/1959  United Kingdom ........ 423/262

OTHER PUBLICATIONS

Kirk-Othmer Encyclopedia of Chemical Technology, 3rd ed. John Wiley & Sons, 1980, pp. 264-268 (vol. 12).

Primary Examiner—John Doll
Assistant Examiner—Jeffrey Edwin Russel
Attorney, Agent, or Firm—Wall and Roehrig

[57] ABSTRACT

This invention provides a manufacturing process which produces highly purified Xenon economically and safely with high recovery efficiency. In this invention liquid oxygen containing Xenon, which is vented from the main condenser in the upper rectification column of the air separating unit, is sequentially fed into multiple adsorptive columns filled with an adsorbent to selectively adsorb the Xenon. By a sequence of adsorbing-desorbing steps, Xenon is gradually condensed and, at the final state, highly purified Xenon is recovered. Hydrocarbons ($C_mH_n$) are removed from the product gas by a catalytic process. Xenon at a purity as high as 99.995% and at a yield as high as 95% is obtained by use of the present process.

9 Claims, 1 Drawing Sheet

4,874,592

PRODUCTION PROCESS OF XENON

BACKGROUND OF THE INVENTION

This invention relates to a production process for purifying Xenon, and in particular to highly efficient procedures wherein Xenon is extracted from liquid oxygen vented from the main condenser of an air separating unit.

Xenon is contained in small quantities (i.e., 0.086 ppm) in the air and Xenon is now manufactured concurrently with Krypton from liquid oxygen that is taken from the main condenser unit of an air separating unit. There is, however, no production method presently available for manufacturing the Xenon solely from ambient air that is free from Krypton.

In a widely used commercial process for manufacturing Xenon, methane gas and trace amounts of other hydrocarbon groups (hereinafter designated as CmHn), are produced along with Xenon. As is well known, methane can be dangerous in that concentrated amounts of the gas can cause explosions.

Other methods have been proposed to prevent this problem. For example, the concentration of both Krypton and Xenon may be controlled so that the gas does not exceed a certain explosion threshold level. This can be achieved by use of a catalytic reactor for removing hydrocarbons from the gas. This type of process is reported in *Fuji Techno-System Technical Report*, 61-2-1, pp. 430/431, 1986. In another process, oxygen and argon are exchanged in an argon exchanging column and Krypton and Xenon are concentrated using the rectifying process as described in *Tokko-Sho*, 47-22937, 1972. In still another process, Krypton and Xenon are again concentrated using a rectification technique after high pressure nitrogen is exchanged for oxygen. This process is reported in *Tokkai-Sho*, 57-95583, 1982.

As mentioned above in connection with the widely used commercial process, liquid oxygen vented from the main condenser of an upper rectification column in the air separating unit usually contains several ppm of Xenon along with Krypton and hydrocarbons, mostly in the form of methane with some other trace elements being present. The concentration of Krypton and Xenon must be closely controlled to prevent hydrocarbon groups from exploding. This requires that (1) a multiple steps rectifying operation be employed to purify the raw Krypton and Xenon, and (2) oxygen can be exchanged for an inert gas. These additional requirements therefore increase the cost of the system and reduce its efficiency.

OBJECTS AND SUMMARY OF THE INVENTION

The main object of this invention is to manufacture high purity Xenon from air using a highly efficient and safe process.

The above and other objects, features and advantages of this invention will be more fully understood from the ensuing description of the invention, which should be read in association with the accompanying drawings.

DETAILED DESCRIPTION OF THE PREFERRED EMBODIMENT

Figure 1:
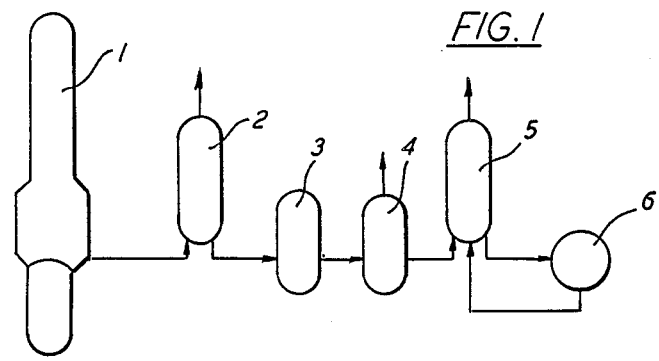
FIG. 1 illustrates a process diagram for one embodiment of this invention.

In this invention liquid oxygen containing Xenon is fed from the main condenser in the upper rectification column of a suitable air separating unit sequentially into multiple adsorptive columns filled with an adsorbent capable of adsorbing Xenon selectively from the liquid oxygen. By use of this sequential adsorption process, Xenon is condensed in stages, and at the outlet final stage, high purity Xenon is recovered. Hydrocarbons (CmHn) are removed from the process gas by means of a catalytic reaction.

The major purpose of using an adsorbent to adsorb selectively the Xenon in this process is to efficiently produce high purity Xenon and to prevent methane from building up in the equipment where it can produce explosions. The high recovery efficiency is achieved by the following sequences: (1) venting oxygen containing Xenon from an air separator to an adsorptive column where Xenon is collected, (2) stopping the supplying operation of the raw material when Xenon starts to flow from the exhaust side of the column, (i.e., when the adsorbent becomes saturated), and (3) recovering the adsorbed Xenon.

When an adsorbent is used to selectively adsorb substances other than Xenon from a Xenon containing gas, the recovery efficiency of the process is relatively low. It has been found that some of the Xenon will be adsorbed with the other materials and thus, not be recovered.

Using multiple adsorptive columns for adsorbing Xenon rather than other substances found in the raw gas minimizes the amount of Xenon which is exhausted from the system thus raising the efficiency of the present system above levels heretofore attainable by use of other more conventional systems. In addition, with the use of a series of condensation and purification steps, the amount of impurities in the recovered product gas can also be reduced to a point where the recovered product is almost pure Xenon.

Furthermore, in the case when the inside of the final adsorptive column is purged using a portion of the product gas, high purification of Xenon can be achieved using less columns under conditions where most of the Xenon remains inside the columns and all of the oxygen is exhausted from the system.

Silica gel, active carbon or zeolite, which possesses a molecular sieving effect, can be used as effective adsorbents to adsorb the Xenon within the recovery column.

The significant function of this invention stems from the fact that high purity Xenon can be safely obtained at high concentration levels through an adsorption and separation process that produces mainly Xenon from liquid oxygen supplied from the main condenser of the upper rectifying column in the air separating unit.

It will become apparent from the description below that (1) high pressure equipment is not required in the present process because Xenon is recovered mainly by an adsorptive reaction, while in the more conventional rectifying processes, Xenon is produced concurrently with Krypton, (2) exchanging oxygen with an inert gas is not required, (3) there is no risk of explosion, which is usually present when hydrogen group materials are condensed, and (4) high purity Xenon can be produced safely and economically at a high rate of recovery.

The invention will now be explained in greater detail with reference to the following examples:

EXAMPLE I

According to the process diagram illustrated in FIG. 1, 150 m$^3$/Hr of liquid oxygen is vented from the rectifying column 1 of an air separating unit having an oxygen generating capacity of 15,000 m$^3$/Hr. It was found that the gasified oxygen contained 31 ppm Xenon, 70 ppm Krypton, 38 ppm methane, and trace amounts of other types of hydrocarbons.

The liquid oxygen vented from the rectifying column was fed to an adsorption column 2 which was at a pressure of 0.118 MPa. The column was maintained at a temperature of $-170°$ C. using the vented liquid oxygen as a cryogenic source. The column was packed with silica gel capable of selectively adsorbing Xenon from raw gas. The flow of vented oxygen was continued until the adsorbent material was saturated. The input was then terminated and a desorption process carried out by heating the column to $-120°$ C. while reducing the column pressure to 0.0133 MPa. It was noted that the concentration of Xenon in the recovered gas at this time was 1.47%, Krypton 0.14% and CmHn 0.065. As can be seen the concentration of CmHn was far below the explosion limit of the gas mixture.

The desorbed gas was introduced into reactor column 3 which contained a catalyst for removing hydrocarbons from the recovered gas. A Pt-Pd catalyst was used for the purpose of changing the hydrocarbon's components to $CO_2$ and $H_2O$. The mixture was next passed through a removal column 4 wherein the $CO_2$ and $H_2O$ components were removed from the system.

The concentrated gas was passed from the removal column to a second adsorptive column 5 that was also packed with silica gel and maintained at an adsorption pressure of 0.118 MPa and a temperature of $-150°$ C. The adsorption process was allowed to reach equilibrium after which the column was heated to $-100°$ C. to free Xenon from the silica gel. The desorbed gas was recovered in a product tank 6. A portion of the recovered gas from the tank was fed back into the second adsorption column 5 and adsorbed at a temperature of $-100°$ C. The column was purged of Krypton and oxygen and the Xenon recovered by heating the column up to room temperature without further evacuation. The desorbed gas recovered from the column was found to be 99.9% pure Xenon.

The amount of recovered gas needed to purge column 5 can be reduced by desorbing column 2 by heating column 2 to a temperature of 120° C. and reducing the column pressure to 0.0133 MPa. Under these conditions the gas recovered from column 2 will contain 9.3% Xenon, 0.51% Krypton, and 0.24% CmHn.

A beneficial effect is gained in the present process by installing both the adsorptive column 2 and the removal column 4 after the rectifying column 1 in the process. In this arrangement the loss of Xenon is minimized because the Xenon concentration in the gas recovered from the adsorptive column 2 is also relatively low.

Although any temperature above the liquefying temperature of oxygen is acceptable for operating the adsorptive column 2, it has been noted that the Xenon concentration in Column 2 will be sufficiently high when the column is operated in a range of between $-150°$ C. and about $-180°$ C. Similarly, adsorptive column 5 can be operated at a temperature above the liquefying temperature of Xenon. It was found that an operating temperature in the range of $-120°$ C. and $-150°$ C. is optimum for obtaining high Xenon concentrations using the noted process. The adsorptive pressure of column 5 can also be varied between atmospheric pressure and 3.0 Kg/cmG.

EXAMPLE II

Figure 2:
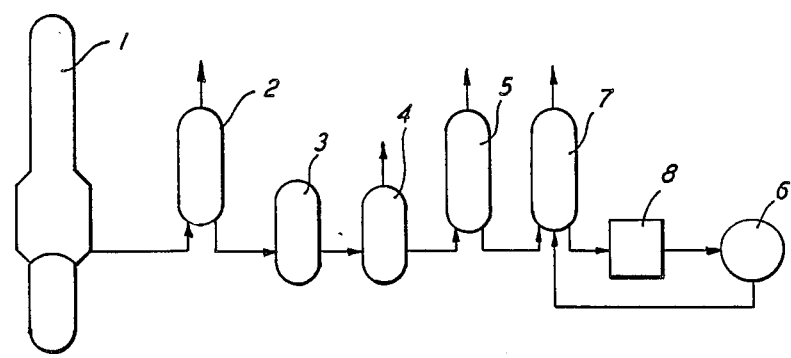
FIG. 2 shows a process diagram for another embodiment of this invention, wherein 1 is a rectifying column; 2 and 5 are adsorptive columns; 3 is a catalyst column; 4 is a removal column, 6 is a product gas tank; 7 is a purification column; and 8 is a deoxidizing column.

FIG. 2 illustrates a process similar to that shown in reference to Example I above. The process sequence is as follows:

(1) liquid oxygen from the rectifying column 1 of an air separator is vented into adsorptive column 2 of the type described above wherein Xenon is adsorbed, (2) column 2 is desorbed by heating the recovered gas introduced into the catalyst column 3, (3) CmHn in the gas is then converted to $CO_2$ and $H_2O$ in the catalyst column 3, (4) $CO_2$ and $H_2O$ from the gas in removal column 4, (5) concentrated Xenon is fed from the removal column to second adsorptive column 5 to fully adsorb the Xenon therein, and (6) column 5 is desorbed and the recovered Xenon is collected in recovery tank 6.

In addition to the noted steps, the gas recovered from column 5 was passed through a purification column 7 which was packed with active carbon at $-20°$ C. until the carbon was fully saturated. The inside of the column was then purged and a portion of the product gas was fed from the previously noted product gas recovery tank 6 into the purification column. The purification column was heated up to a temperature of 90° C. and the recovered product gas returned to tank 6. A deoxidizing column 8 was also operatively positioned between the product gas outlet of column 7 and the recovery tank 6. The column 8 contained a deoxidizing agent for removing remaining oxygen from the recovered gas. The recovered gas was tested and was found to be 99.995% Xenon.

The efficiency of Xenon recovery may be increased to 95% by feeding a portion of the product gas from the outlet of column 5 to the inlet of column 2 while at the same time feeding a portion of the higher concentration produced gas from the recovery tank 6 to the inlet side of the purification column 7.

The optimum operating ranges of columns 2 and 5 were the same as those described above with reference to Example I. The operating temperature of purification column 7 was varied between $-65°$ C. and room temperature and exhibited a high recovery efficiency of Xenon.

While this invention has been explained with reference to the structure disclosed herein, it is not confined to the details as set forth and this application is intended to cover any modifications and changes as may come within the scope of the following claims.

What is claimed is:

1. A process for the production of Xenon that includes the steps of
venting liquid oxygen from the rectifying column of an air separator sequentially into a plurality of adsorption-desorption stages which contain columns filled with an adsorbent for adsorbing Xenon from the vented liquid oxygen,
adsorbing and desorbing Xenon sequentially in each of the adsorption-desorption stages to concentrate the recovered Xenon, catalytically removing hydrocarbon substances (CmHn) from Xenon gas recovered from the first adsorption-desorption stage.

2. The process of claim 1 that includes the further step of purging the last adsorption-desorption stage in the series after it has been desorbed by recycling a portion of the Xenon recovered from the last stage through the last stage column.

3. The process of claim 1 that includes the further step of purifying the recovered Xenon gas leaving the last stage by feeding the gas through a purification tower containing a deoxidizing material.

4. A process for the production of Xenon from air that includes the steps of venting liquid oxygen from the rectifying column of an air separating unit into a first adsorption-desorption column containing an adsorbant capable of adsorbing Xenon at a temperature above the liquefying temperature of oxygen, saturating the adsorbant in the first column with Xenon, heating the first column above the desorbing temperature of the adsorbant material and delivering the desorbed Xenon gas to a removal column, removing the hydrocarbon components from the Xenon gas recovered from the first column, introducing the Xenon gas into a second adsorption-desorption column containing an adsorbant for adsorbing Xenon, cooling the second adsorbing-desorbing column to a temperature whereby the Xenon is adsorbed by said material, heating the second adsorbing-desorbing column to a higher temperature whereby the Xenon is desorbed from said adsorbant material and recovering the desorbed Xenon from the second column.

5. The process of claim 4 that includes the further step of purging the second adsorbing-desorbing column by recycling a portion of the Xenon gas recovered from said column through said column.

6. The process of claim 4 that includes the further step of feeding the Xenon gas recovered from the second adsorbing desorbing column through a purification column containing a material for removing oxygen from said gas.

7. The process of claim 6 wherein the adsorption-desorption columns are packed with silica gel and the purification column is packed with activated carbon.

8. The process of claim 6 that includes the further step of purging the purification column by recycling recovered gas from said purification column back through said purification column.

9. The process of claim 4 that includes the further step of introducing a portion of the Xenon gas recovered from the second adsorbant-desorbant column to the inlet of the first adsorbing-desorbing column to reprocess the said recovered gas through the columns.

* * * * *